US008825295B2

(12) United States Patent
Turner

(10) Patent No.: US 8,825,295 B2
(45) Date of Patent: Sep. 2, 2014

(54) SYSTEM AND METHOD FOR DETERMINING A STEERING ANGLE FOR A VEHICLE AND SYSTEM AND METHOD FOR CONTROLLING A VEHICLE BASED ON SAME

(75) Inventor: Steven Paul Turner, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 1008 days.

(21) Appl. No.: 12/857,359

(22) Filed: Aug. 16, 2010

(65) Prior Publication Data
US 2012/0041644 A1 Feb. 16, 2012

(51) Int. Cl.
*B62D 9/00* (2006.01)
*B62D 15/02* (2006.01)

(52) U.S. Cl.
CPC .......... *B62D 15/024* (2013.01); *B62D 15/0215* (2013.01); *B62D 15/021* (2013.01); *B62D 15/0245* (2013.01); *B62D 15/02* (2013.01)
USPC .............................. 701/41; 701/33.1; 702/87

(58) Field of Classification Search
CPC .. B62D 15/02; B62D 15/021; B62D 15/0215; B62D 15/024; B62D 15/0245
USPC ........... 701/41, 42, 33.1, 33.4, 33.7, 29.2, 36, 701/43, 34.4; 702/85, 87, 151; 340/465; 180/446, 466, 440, 442, 444; 280/86.758, 5.51
See application file for complete search history.

(56) References Cited

U.S. PATENT DOCUMENTS

| 5,001,637 | A | * | 3/1991 | Shiraishi et al. | 701/41 |
|---|---|---|---|---|---|
| 5,029,466 | A | * | 7/1991 | Nishihara et al. | 73/117.02 |
| 5,261,501 | A | * | 11/1993 | Tsuchiya et al. | 180/412 |
| 5,341,893 | A | * | 8/1994 | Fukui et al. | 180/245 |
| 5,343,393 | A | * | 8/1994 | Hirano et al. | 701/41 |
| 5,438,515 | A | * | 8/1995 | Miichi et al. | 701/36 |
| 5,642,281 | A | * | 6/1997 | Ishida et al. | 701/41 |
| 5,787,375 | A | | 7/1998 | Madau et al. | |
| 5,991,671 | A | * | 11/1999 | Nishiwaki | 701/23 |
| 6,078,851 | A | * | 6/2000 | Sugitani | 701/30.6 |
| 6,131,059 | A | * | 10/2000 | Kaji et al. | 701/41 |
| 6,144,908 | A | * | 11/2000 | Yasuda | 701/41 |
| 6,208,921 | B1 | | 3/2001 | Tsunehara et al. | |
| 6,371,239 | B2 | * | 4/2002 | Furumi et al. | 180/445 |
| 6,466,848 | B2 | * | 10/2002 | Ozaki | 701/41 |
| 6,560,518 | B1 | | 5/2003 | Ashrafi et al. | |

(Continued)

*Primary Examiner* — Thomas G Black
*Assistant Examiner* — Sze-Hon Kong
(74) *Attorney, Agent, or Firm* — Kenealy Vaidya LLP

(57) ABSTRACT

A system for determining an angular position of a pair of steerable wheels of a vehicle having a plurality of wheels can include a yaw rate sensor, a pair of wheel speed sensors and a controller. The yaw rate sensor can be configured to output data representative of an angular velocity of the vehicle about a vertical axis of the vehicle. Each of the pair of wheel speed sensors can be configured to output data representative of a rotational velocity of a respective one of the plurality of wheels. The controller can be in electrical communication with each of the pair of wheel speed sensors and the yaw rate sensor. The controller can be configured to determine a first steering angle based on data received from the yaw rate sensor, to determine a second steering angle based on data received from the plurality of wheel speed sensors, and to select one of the first steering angle and the second steering angle for use in manipulating various vehicle parameters, including torque vectoring parameters, among other parameters.

21 Claims, 5 Drawing Sheets

(56) References Cited

U.S. PATENT DOCUMENTS

| | | |
|---|---|---|
| 6,775,604 B2 * 8/2004 | Dilger | 701/41 |
| 6,789,017 B2 * 9/2004 | Aanen et al. | 701/41 |
| 6,865,463 B2 * 3/2005 | Suzuki | 701/43 |
| 6,895,357 B2 * 5/2005 | Lou et al. | 702/151 |
| 6,928,352 B2   8/2005 | Yao et al. | |
| 6,929,089 B2 * 8/2005 | Asada | 180/446 |
| 7,028,804 B2 * 4/2006 | Eki et al. | 180/446 |
| 7,099,759 B2   8/2006 | Ghoneim | |
| 7,130,729 B2  10/2006 | Shin et al. | |
| 7,136,732 B2 * 11/2006 | Shimizu et al. | 701/41 |
| 7,146,287 B2 * 12/2006 | Kichise et al. | 702/151 |
| 7,328,124 B2 * 2/2008 | Voeller | 702/151 |
| 7,440,829 B2 * 10/2008 | Hara | 701/41 |
| 7,472,004 B2 * 12/2008 | Hara et al. | 701/41 |
| 7,477,973 B2 * 1/2009 | Brewer et al. | 701/41 |
| 7,481,294 B2 * 1/2009 | Fujita et al. | 180/446 |
| 7,519,464 B2 * 4/2009 | Sakugawa | 701/70 |
| 7,551,997 B2 * 6/2009 | Inage | 701/41 |
| 7,690,477 B2 * 4/2010 | Ogawa et al. | 180/446 |
| 7,706,943 B2 * 4/2010 | Shimazaki | 701/41 |
| 7,739,001 B2 * 6/2010 | Kato et al. | 701/2 |
| 8,103,410 B2 * 1/2012 | Hatano et al. | 701/41 |
| 8,145,385 B2 * 3/2012 | Hayakawa et al. | 701/42 |
| 8,234,043 B2 * 7/2012 | Yasutake et al. | 701/42 |
| 8,255,120 B2 * 8/2012 | Mikuriya et al. | 701/42 |
| 8,306,702 B2 * 11/2012 | Suzuki et al. | 701/42 |
| 8,326,491 B2 * 12/2012 | Gartner | 701/42 |
| 8,364,348 B2 * 1/2013 | Zell et al. | 701/41 |
| 8,392,066 B2 * 3/2013 | Ehara et al. | 701/41 |
| 8,428,822 B2 * 4/2013 | Shartle et al. | 701/41 |
| 8,571,758 B2 * 10/2013 | Klier et al. | 701/41 |
| 2002/0003057 A1 * 1/2002 | Mori et al. | 180/248 |
| 2004/0206570 A1 * 10/2004 | Tajima et al. | 180/402 |
| 2005/0075828 A1 * 4/2005 | Sakabe et al. | 702/151 |
| 2006/0041358 A1   2/2006 | Hara | 701/41 |
| 2006/0069480 A1   3/2006 | Hiwatashi | 701/41 |
| 2006/0080015 A1   4/2006 | Voeller | 701/41 |
| 2007/0029748 A1 * 2/2007 | Baxter et al. | 280/86.758 |
| 2007/0118263 A1 * 5/2007 | Nelson | 701/41 |
| 2007/0260388 A1  11/2007 | Watanabe | |
| 2008/0119986 A1 * 5/2008 | Wei et al. | 701/41 |
| 2008/0294313 A1 * 11/2008 | Aoki et al. | 701/43 |
| 2009/0043443 A1   2/2009 | Wei et al. | |
| 2009/0287375 A1  11/2009 | Lavoie et al. | |
| 2010/0066515 A1 * 3/2010 | Shimazaki et al. | 340/435 |
| 2010/0268419 A1 * 10/2010 | Yasui et al. | 701/41 |
| 2011/0071727 A1 * 3/2011 | Bechtler et al. | 701/34 |
| 2011/0178671 A1 * 7/2011 | Bae et al. | 701/29 |

* cited by examiner

SYSTEM AND METHOD FOR DETERMINING A STEERING ANGLE FOR A VEHICLE AND SYSTEM AND METHOD FOR CONTROLLING A VEHICLE BASED ON SAME

BACKGROUND

1. Field

The present invention relates to devices, systems, and processes useful as an assistance feature to supplement an operator's control input to a vehicle.

2. Description of the Related Art

Vehicles have typically included a system(s) that assist the operator's input for the control of the vehicle. This assistance can supplement the operator's control of the vehicle to enhance comfort for the operator/passenger(s) and/or to enhance dynamic performance of the vehicle. Examples of an operator assistance system can include, but are not limited to, power steering systems, anti-lock braking systems (ABS), traction control systems (TCS), stability assistance systems (aka, VSA, VSC or ESP)—which can be, active suspension systems, all-wheel drive systems (AWD) and four-wheel steering systems (4ws). Some of these operator assistance systems can signal the operator to alter their input through visual, aural or tactile notification. Examples of these systems can include, but are not limited to, active braking systems, lane departure warning systems, parking assistance systems and obstacle avoidance systems. Each of these operator assistance systems are generally known in the art.

The operator assistance system can include a controller—also called an electronic control unit (ECU) or a central processing unit (CPU)—at least one sensor, and at least one actuator in electrical communication with the ECU. The ECU often relies on data generated by a steering angle sensor so that the ECU can interpret the operator's input and send an appropriate signal(s) to the appropriate actuator(s) to supplement the operator's input.

In many of these operator assistance systems, it can be advantageous for the ECU to rely on data from the steering angle sensor to determine whether the vehicle operator is attempting to steer the vehicle to the left or to the right relative to a neutral position, as well the magnitude of the directional change (relative to the neutral position) intended by the operator. Typically, the neutral position corresponds to the position of the steering system components and the steering angle sensor when the vehicle travels along a substantially straight path. It is known in the art to position the steering angle sensor within the steering system of the vehicle such that the steering angle sensor can detect the operator's steering input. The steering angle sensor can be an absolute position or a relative position sensor. Both types of steering sensors and their implementation are known in the art.

An absolute position sensor can indicate, at any time, the position of the steering wheel relative to the neutral position. As a result, an absolute steering position sensor can be a complicated device and can be expensive to produce. Further, in some of these operator assistance systems, it may be unnecessary to determine the neutral position for appropriate operation of the system. Thus, an absolute position sensor can increase the cost and/or complexity of the operator assistance system with no corresponding benefit.

In contrast, a relative position sensor can be less complex in design and less costly compared to an absolute position sensor. However, a relative position sensor can detect only a change in position of the steering wheel relative to the previously detected position. Thus, the raw sensor data can neither indicate the direction relative to the neutral position to which the operator has turned the steering wheel nor indicate how far from the neutral position the operator has turned the steering wheel. In order to translate the raw sensor data into absolute position data, additional electronic circuitry and/or software can be provided in the sensor assembly, or in the ECU, so that the neutral position can be determined either by the sensor or the ECU. This additional circuitry can offset or exceed the cost and/or the complexity advantage(s) that the relative position sensor can have over an absolute position sensor.

Operator assistance systems known in the art that employ a relative position sensor and also rely on determination of the neutral position typically do not store the neutral position of the steering angle sensor after the vehicle is shut down. Thus, the neutral position determination algorithm is performed each time the vehicle is started. Operation of this algorithm is dependent on a particular travel path(s) taken by the vehicle. As such, it can take a finite period of time to complete. Thus, the vehicle assistance system can be rendered ineffective prior to completion of the neutral position determination algorithm.

There is, and has been, a need to provide a system and method that can obtain and process real-time data indicative of the operator's steering direction input (i.e., left or right) and the magnitude of the steering input (i.e., how far from neutral the driver has rotated the steering wheel) via a relative position sensor as close to vehicle start-up as possible, where the system and method are relatively simple in design and have a minimum cost.

In order to provide the operator assistance system utilizing a relative position steering angle sensor with relevant steering angle data, there is a need to provide an estimated steering angle that can approximate the actual angle of the steerable wheels of the vehicle until the neutral position algorithm is complete.

Further, a failure of the steering sensor or interruption of data from the sensor can cause the operator input assistance system to shut down (or otherwise be impaired to a certain degree) until the failure or interruption is resolved, thereby canceling the assistance to the operator's input. Thus, there is a need to provide a failure mode where the steering angle can be approximated from at least one other vehicle dynamic sensor so that the operator input assistance system can operate in a sufficient manner despite a failure of the steering angle sensor.

SUMMARY

According to one aspect of the disclosure a system for determining an angular position of a pair of steerable wheels of a vehicle having a plurality of wheels can include a yaw rate sensor, a pair of wheel speed sensors and a controller. The yaw rate sensor can be configured to output data representative of an angular velocity of the vehicle about a vertical axis of the vehicle. Each of the pair of wheel speed sensors can be configured to output data representative of a rotational velocity of a respective one of the plurality of wheels. The controller can be in electrical communication with each of the pair of wheel speed sensors and the yaw rate sensor. And, the controller can be configured to determine a first steering angle based on data received from the yaw rate sensor, determine a second steering angle based on data received from the plurality of wheel speed sensors, and select one of the first steering angle and the second steering angle.

According to an aspect of the disclosed subject matter, a method for determining a steering angle of a pair of steerable wheels of a vehicle having a plurality of wheels can include determining a first steering angle based on a yaw rate of the vehicle, determining a second steering angle based on rotational velocity data of the plurality of wheels, and selecting one of the first steering angle and the second steering angle.

According to another aspect of the disclosed subject matter, A control system for an all-wheel drive powertrain of a vehicle having a power source configured to produce torque, a steerable pair of wheels configured to be driven by the torque, and a second pair of wheels configured to be selectively driven by the torque, the control system can include a first clutch assembly, a second clutch assembly, a yaw rate sensor, a pair of wheel speed sensors and a controller. The first clutch assembly can selectively connect a first wheel of the second pair of wheels to the power source. The second clutch assembly can selectively connect a second wheel of the second pair of wheels to the power source. The yaw rate sensor can be configured to output data representative of an angular velocity of the vehicle about a vertical axis of the vehicle. Each of the pair of wheel speed sensors can be configured to output data representative of a rotational velocity of a respective one of the second pair of wheels. The controller can be in electrical communication with each of the plurality of wheel speed sensors and the yaw rate sensor. And, the controller can be configured to determine a first steering angle based on data received from the yaw rate sensor, determine a second steering angle based on data received from the plurality of wheel speed sensors, select one of the first steering angle and the second steering angle, and modulate the clutch assemblies based on the selected one of the first steering angle and the second steering angle to vary transmission of torque from the power source to the second pair of wheels.

According to yet another aspect of the disclosed subject matter, a method for controlling an on-demand all-wheel drive system of a vehicle to supplement an operator's input to the vehicle can include: providing a power source, pair of steerable wheels driven by the power source, a pair of rear wheels selectively driven by the power source, a pair of rear clutch assemblies selectively connecting a respective one of the pair of rear wheels to the power source, a yaw rate sensor configured to output data representative of an angular velocity of the vehicle about a vertical axis of the vehicle, and a pair of wheel speed sensors configured to output data representative of a rotational speed of a respective one of the pair of rear wheels; determining a first steering angle based on the data from the yaw rate sensor; determining a second steering angle based on the rotational speed data; and selecting one of the first steering angle and the second steering angle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
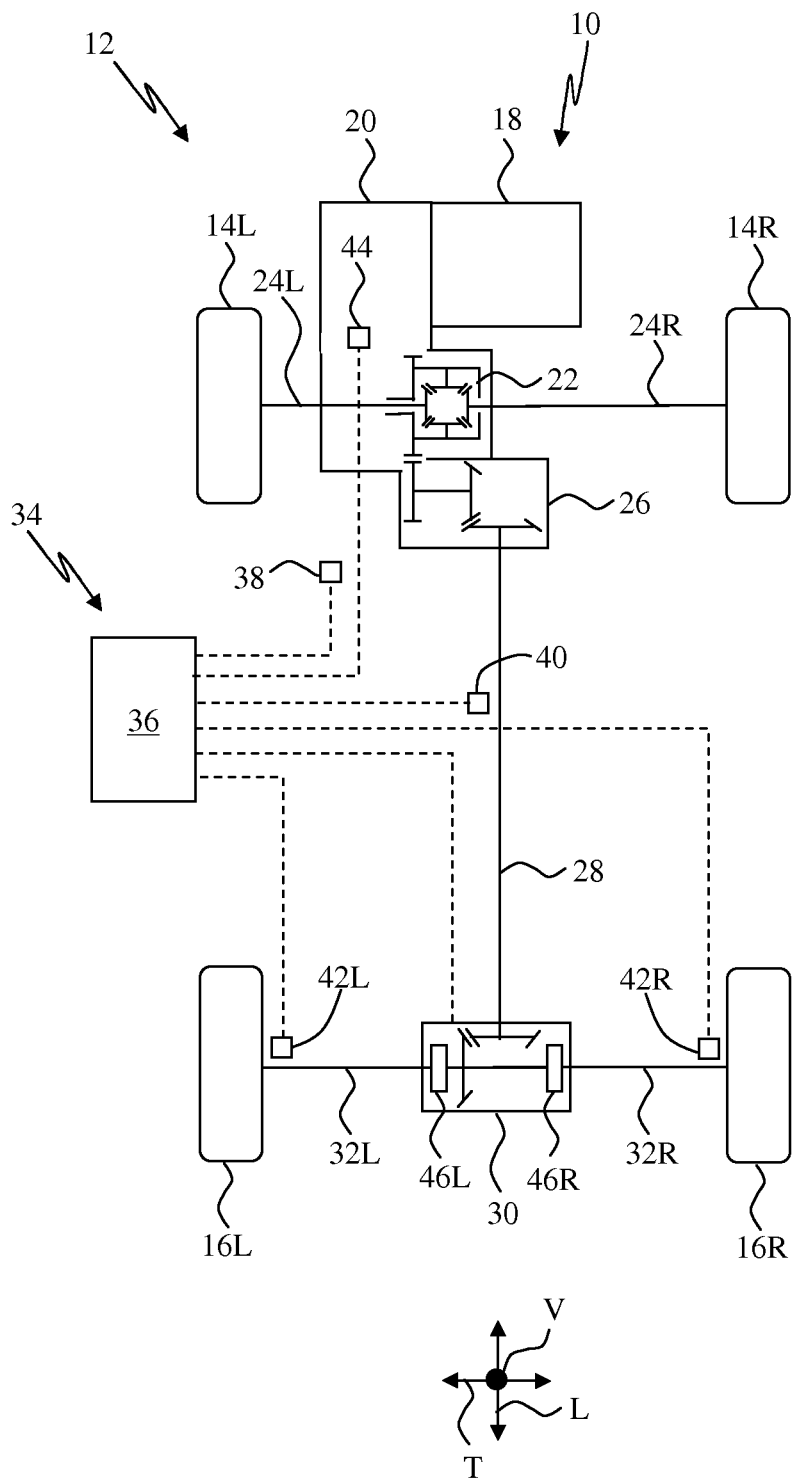
FIG. 1 is a schematic view of an exemplary powertrain for a vehicle made in accordance with the disclosed subject matter.

FIG. 1 illustrates an embodiment of a powertrain 10 for a vehicle 12, where the vehicle 12 has a longitudinal direction L, a transverse direction T perpendicular to the longitudinal direction, and a vertical direction V perpendicular to both the longitudinal direction L and the transverse direction T. The powertrain 10 can be configured as an on-demand, part-time, all-wheel drive system in accordance with the principles of the disclosed subject matter. This exemplary powertrain 10 can be configured such that the steerable front wheels 14L, 14R are the primary drive wheels and the rear wheels 16L, 16R are selectively driven automatically when additional tractive effort is appropriate for the given vehicle conditions. However, the powertrain 10 can be configured such that the rear wheels 16L, 16R are the primary drive wheels and the front wheels 14L, 14R are driven only when additional tractive effort is appropriate. In other embodiments, the powertrain 10 can be configured as: a full-time, all-wheel drive system; a manually-engageable, part-time all-wheel drive system; a front-wheel drive system; or a rear-wheel drive system, all of which are generally known in the art.

The powertrain 10 can include a power source 18, a transmission 20, the pair of front wheels 14L, 14R, the pair of rear wheels 16L, 16R, a front differential assembly 22, a pair of front driveshafts 24L, 24R, a power-take-off assembly 26, a propeller shaft 28, a rear differential assembly 30, a pair of rear driveshafts 32L, 32R and a control system 34 arranged in a manner known in the art.

The control system 34 can be configured to automatically engage/disengage the rear wheels 16L, 16R with the power source 18, as appropriate. An exemplary control system is disclosed in co-pending U.S. patent application Ser. No. 12/847,880, entitled "Control System and Method for Automatic Control of Selection of On-Demand All-Wheel Drive Assembly for A Vehicle Drivetrain", and filed Jul. 30, 2010, which is incorporated herein by reference in its entirety.

The control system 34 also can be configured to determine a steering angle signal, $\delta_{AWD}$, which can correspond with the real-time toe angle of the front wheels 14L, 14R targeted by the vehicle operator and can control the vehicle 12 based on the steering angle signal, $\delta_{AWD}$, in accordance with principles of the disclosed subject matter. The control system 34 can include one or more of a controller 36, a steering angle sensor 38, a yaw rate sensor 40, a pair of wheel speed sensors 42L, 42R, a transmission output shaft speed sensor 44 and a pair of clutch assemblies 46L, 46R. The controller 36 can be in electrical communication with each of the sensors 38, 40, 42L, 42R, 44 and each of the clutch assemblies 46L, 46R. The controller 36 can be referred to as an electronic control unit (ECU) or as a central processing unit (CPU). The pair of clutch assemblies 46L, 46R can be mounted within the rear differential assembly 30.

The steering angle sensor 38 can be located adjacent a component of the steering system (not illustrated) that lies between the steering wheel (not illustrated) and either one of the front wheels 14L, 14R. The steering angle sensor 38 can measure movement of this component when the vehicle operator rotates the steering wheel. For example, the steering angle sensor 38 can lie adjacent the steering column (not illustrated) to detect rotary movement of the steering column. In another example, the steering angle sensor 38 can lie adjacent the steering rack (not illustrated) to detect linear movement of the steering rack. In yet another example, the steering angle sensor 38 can be associated with an electric power steering (EPS) motor (not illustrated) to detect movement of the EPS motor relative to the steering rack. Other configurations of the steering angle sensor 38 are also possible. The data from the steering angle sensor 38 can be processed by the steering angle sensor 38 or by the ECU 36 to determine the steering angle signal, $\delta_{AWD}$. From the steering angle signal, $\delta_{AWD}$, the ECU 36 can determine the operator's intended directional target for the vehicle 12. Further details regarding the determination and usage of the steering angle signal, $\delta_{AWD}$, by the ECU 36 are provided below.

The yaw rate sensor 40 can be mounted on an appropriate portion of the vehicle 12 to detect angular rotation of the vehicle 12 about an axis extending in the vertical direction V. The raw data from the yaw rate sensor 40 can be processed by the yaw rate sensor 40 or by the ECU 36 to indicate an angular velocity of the vehicle 12 about its vertical axis V. Yaw rate sensors and their use in vehicular control systems are generally known in the art.

The wheel speed sensors 42L, 42R can be mounted on an appropriate portion of the vehicle 12 to detect rotation of the respective rear wheel 16L, 16R (or the respective rear driveshaft 321, 32R) and are generally known in the art. The raw data from the wheel speed sensors 42L, 42R can be processed by one or both of the wheel speed sensors 42L, 42R or by the ECU 36 to indicate a rotational velocity of the respective rear wheels 16L, 16R. Although not illustrated in FIG. 1, the vehicle 12 also can include a respective wheel speed sensor associated with each of the front wheels 14L, 14R (or front driveshafts 24L, 24R). The wheel speed sensors 42L, 42R can be any sensor known in the art to provide the appropriate data.

Alternatively, instead of with the ECU 36, the wheels speed sensors 42L, 42R can be in electrical communication with an additional controller (not illustrated) that is different from the ECU 36. This additional controller can be in electrical communication with the ECU 36. This additional controller can be utilized to affect a different control system of the vehicle 12, such as, but not limited to, an anti-lock brake system (not illustrated). This additional controller can be configured to receive processed data from the wheel speed sensors 42L, 42R or to receive the raw data from the wheel speed sensors 42L, 42R and process the raw data to indicate a rotational velocity of the respective wheels 12L, 16R. Then, this additional controller can electrically communicate the processed data to the ECU 36.

The transmission output shaft speed sensor 44 can be adjacent an output shaft (not shown) of the transmission 20. The transmission output shaft speed sensor 44 can detect rotation of the output shaft. The raw data can be processed by the transmission output shaft speed sensor 44 or by the ECU to indicate a rotational velocity of the output shaft and its use is generally known in the art for conversion into a travel velocity of the vehicle. The transmission output shaft speed sensor 44 can be any sensor known in the art to provide the appropriate data.

Alternatively, the output shaft speed sensor 44 can be omitted from the control system 34 and data from the wheel speed sensors 42L, 42R can be used to indicate the travel velocity of the vehicle 12. In this alternate embodiment, the vehicle 12 further can include front wheel speed sensors 43L, 43R. The signals from the wheel speed sensors 42L, 42R, 43L, 43R can be averaged, or they can be subject to a minimum function analysis, or another appropriate process can be employed to determine on which one of the wheel speed sensors 42L, 42R, 43L, 43R to rely. It is also possible assign only one of the sensors 42L, 42R, 43L, 43R to provide data indicative of the vehicle travel velocity. This assignment can be fixed, randomly selectable, or selected based on some operating condition, such as but not limited to, the fault status of each sensor 42L, 42R, 43L, 43R, or the relative magnitudes of the data from each wheel speed sensor 42L, 42R, 43L, 43R, or the turning direction of the vehicle 12, or whether the front wheels 14L, 14R are driving the vehicle 12, or whether the front wheels 14L, 14R and the rear wheels 16L, 16R are driving the vehicle 12.

Based on data received from any combination of the sensors 38, 40, 42L, 42R, 44, and any other inputs known in the art to be appropriate, the ECU 36 can manipulate the clutch assemblies 46L, 46R to vary the distribution of torque from the power source 18 to a respective one of the rear wheels 16L, 16R in a manner that can enhance the performance of the vehicle 12 as it enters, traverses and/or exits a curve, or experiences other driving conditions that warrant operator assistance. That is, the ECU 36 can supplement the steering input to the front wheels 14L, 14R by driving the appropriate one of the rear wheels 16L, 16R (e.g., the outside wheel) with more torque than the other of the rear wheels 16L, 16R (e.g., the inside wheel). Thus, the control system 24 can manipulate torque distribution to the rear wheels 16L, 16R in order to reduce, correct and/or prevent an understeering or oversteering condition of the vehicle 12 as it enters, traverses and/or exits a curve.

Figure 2:
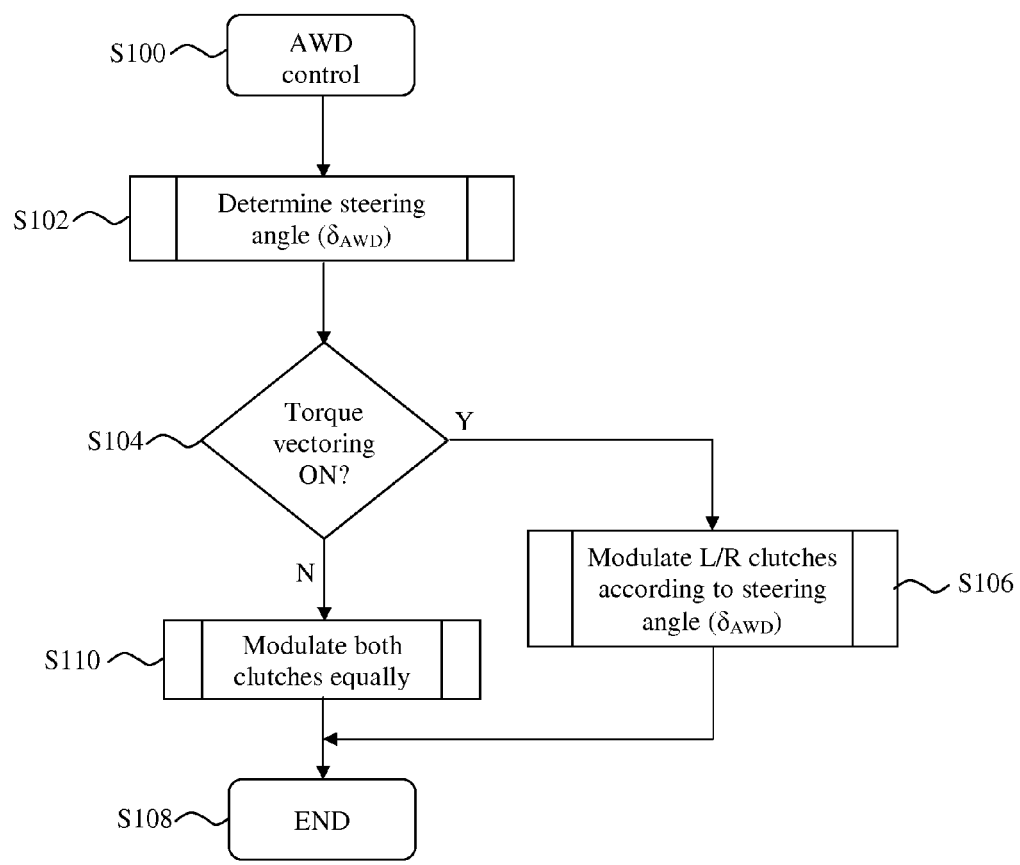
FIG. 2 is a flowchart depicting an exemplary algorithm made in accordance with the disclosed subject matter.

FIG. 2 depicts an exemplary algorithm that the ECU 36 can follow to modulate the clutch assemblies 46L, 46R as mentioned above during its control of the all-wheel drive system (AWD). The ECU 36 can begin the AWD control algorithm at step S100. At step S102, the ECU 36 can determine the steering angle signal, $\delta_{AWD}$, based on data received from the array of sensors 38, 40, 42L, 42R, 44. Details of an exemplary determination of the steering angle signal, $\delta_{AWD}$, by the ECU 36 will be explained below with reference to FIGS. 3-5.

After the ECU 36 determines the steering angle signal, $\delta_{AWD}$, the ECU 36 can proceed to step S104 where the ECU 36 can determine whether torque vectoring through the rear wheels 16L, 16R is appropriate for the given dynamic conditions of the vehicle 12. That is, the ECU 36 can determine at step S104 whether to supplement the operator's input to the steering wheel by driving one of the rear wheels 16L, 16R with more torque that the other of the rear wheels 16L, 16R. In general, when the steering angle signal, $\delta_{AWD}$, indicates the neutral position, the ECU 36 can determine that the vehicle 12 is traveling along a substantially straight path or that the operator intends to direct the vehicle along a substantially straight path. When the steering angle signal, $\delta_{AWD}$, does not indicate the neutral position, the ECU 36 can determine that the operator of the vehicle 12 is either attempting to alter the direction in which the vehicle 12 is traveling or the operator is directing the vehicle along a curved path. Thus, the steering angle signal, $\delta_{AWD}$, can be analyzed by the ECU 36 in conjunction with other dynamic data, such as, but not limited to, yaw rate, lateral acceleration, longitudinal acceleration and individual wheel speeds, to determine whether to supplement the driver's steering input with torque vectoring through the wheels 16L, 16R. Torque vectoring control is generally known in the art and will not be further described. An example of this function of the controller 36 can be found in U.S. Patent Application Publication No. 2007/0260388, which is incorporated herein by reference in its entirety.

If the ECU 36 turns on the torque vectoring feature of the control system 34 at step S104, then the ECU 36 can proceed to step S106. At step S106, the ECU 36 can modulate the torque distribution individually through each of the clutch assemblies 46L, 46R such that an appropriate one of the rear wheels 16L, 16R is driven with more torque from the power source 18 than the other of the rear wheels 16L, 16R. The torque differential between the left rear wheel 16L and the right rear wheel 16R can be a function of the steering angle signal, $\delta_{AWD}$, as is generally known in the art—see, for example, U.S. Patent Application Publication No. 2007/0260388, referenced above. The ECU 36 can then proceed to step S108 where ECU 36 can exit the AWD control algorithm.

If the ECU 36 turns off the torque vectoring feature of the control system 34 at step S104, then the ECU 36 can proceed to step S110. At step S110, the ECU 36 can modulate the torque distribution equally through each of the clutch assemblies 46L, 46R such that both rear wheels 16L, 16R are driven with substantially equal torque when no torque modulation or vectoring is applied. The ECU 36 can then proceed to step S108 where ECU 36 can exit the AWD control algorithm.

The determination by the ECU 36 of the steering angle signal, $\delta_{AWD}$, can be assisted by data received from the steering angle sensor 38, which data can indicate to the ECU 36 the operator's targeted direction of travel for the vehicle 12. The steering angle sensor 38 can provide data representative of the direction and magnitude of any movement of the steering wheel by the vehicle operator in real-time. The steering angle sensor 38 can be positioned in appropriate proximity to an appropriate component of the steering system of the vehicle 12 in any manner described above or known in the art.

As discussed above, the steering angle sensor 38 can be an absolute position sensor or a relative position sensor. In this exemplary embodiment, the steering angle sensor 38 can be a relative position sensor 38. As such, the steering angle sensor 38 can provide data that indicates the direction and magnitude of movement from the last position transmitted to the controller 36. Hence, the steering angle sensor 38 does not provide the ECU 36 with sensor position data relative to the neutral position. As will be described in detail below, the ECU 36 or the steering angle sensor 38 can be configured with hardware and/or software to enable the ECU 36 or the steering angle sensor 38 to translate the raw sensor data into data representing the magnitude and direction of the operator's steering input relative to the neutral position.

Figure 3:
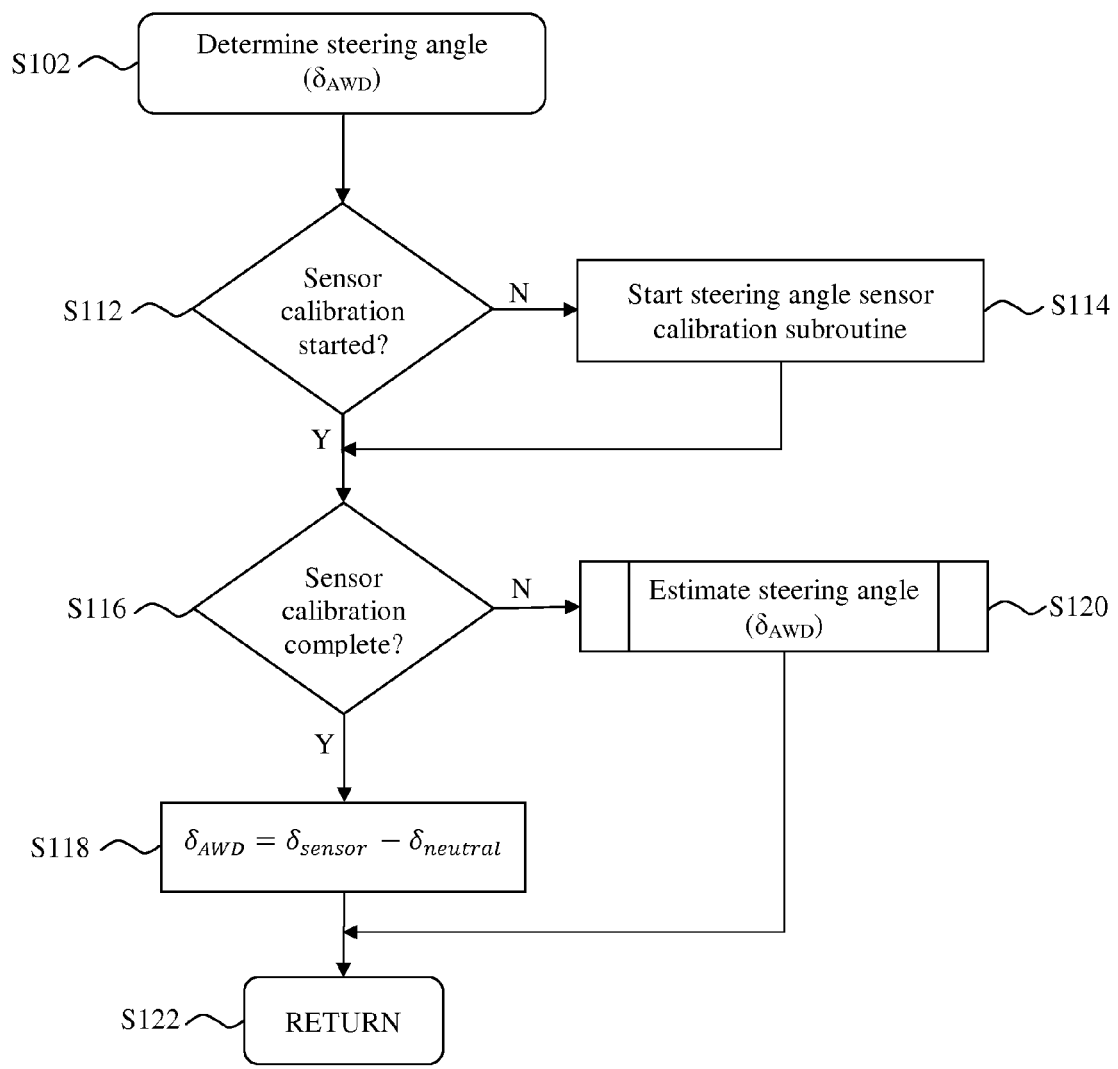
FIG. 3 is a flowchart depicting an exemplary algorithm usable as a subroutine of the algorithm of FIG. 2.

FIG. 3 illustrates a flowchart of an algorithm that the ECU 36 can perform in order to determine a real-time determination of the steering angle signal, $\delta_{AWD}$, referenced in step S102 of FIG. 2. The ECU 36 can begin the steering angle determination algorithm at step S102, and then can proceed to step S112.

At step S112, the ECU 36 can determine whether the ECU 36 has started its calibration of the steering angle sensor 38 so that the neutral position of the steering angle sensor 38 can be determined. Calibration of the sensor 38 can be advantageous after a shut-down of the power source 18, a power interruption to the ECU 36 and/or the steering angle sensor 38, a temporary malfunction of the ECU 36 and/or the steering angle sensor 38, and/or other similar event where prior calibration data can be deleted/lost from a memory device of the control system 34. If the ECU 36 determines at step S112 that the calibration algorithm has not been started, then the ECU 36 can proceed to step S114 where the ECU 36 can start the steering angle calibration algorithm.

The steering angle calibration algorithm of step S114 can take multiple iterations to complete. As a result, the ECU 36 can be configured to operate this algorithm in parallel with the steering angle determination algorithm of FIG. 3. This can permit the ECU 36 to advantageously manipulate the rear clutch assemblies 46L, 46R even though the neutral position of the steering angle sensor 38 is undetermined. The steering angle calibration algorithm represented by step S114 can be any such algorithm known in the art and will not be further described.

After the ECU 36 starts the steering angle calibration algorithm at step S114 or after the ECU 36 determines at step S112 that the steering angle calibration algorithm has been started, the ECU 36 can proceed to step S116. After each iteration of the steering angle calibration algorithm, the ECU 36 can store a value that can indicate the status (e.g., complete or incomplete) of the steering angle calibration algorithm. At step S116, the ECU 36 can determine whether the steering angle calibration algorithm has been completed by the ECU 36 by retrieving and comparing this value during step S116.

In an alternate embodiment, the steering angle sensor 38 can be configured to perform the steering angle calibration algorithm of step S114 (instead of the ECU 36). In this alternate arrangement, the steering angle sensor 38 can signal to the ECU 36 the start and status (e.g., complete or incomplete) of the steering angle algorithm.

If the ECU 36 determines at step S116 that the steering angle calibration algorithm is complete, then the ECU 36 can proceed to step S118. At step S118, the ECU 36 can employ data from the steering angle calibration algorithm and real-time data from the steering angle sensor 38 to determine the steering angle signal, $\delta_{AWD}$, in real-time.

An example of the calculation useful for the determination of the steering angle signal, $\delta_{AWD}$, can be made according to the equation:

$$\delta_{AWD} = \delta_{sensor} - \delta_{neutral}$$

where:
$\delta_{sensor}$ is the real-time data from the steering angle sensor; and $\delta_{neutral}$ is the value of the neutral position of the steering angle sensor 38 obtained from the steering angle calibration algorithm initiated at step S114.

If the ECU 36 determines at step S116 that the steering angle calibration algorithm is not yet complete, then the ECU 36 can proceed to step S120. At step S120, the ECU 36 can follow an algorithm that permits the ECU 36 to estimate the steering angle signal, $\delta_{AWD}$, based on data received by the ECU 36 from vehicle sensors other than the steering angle sensor 38. This estimate of the steering angle signal, $\delta_{AWD}$, can provide an approximation of the real-time toe angle of the front wheels 14L, 14R. Thus, the ECU 36 can employ the steering angle signal, $\delta_{AWD}$, with improved accuracy as compared to a pre-defined constant value. Details of this algorithm will be described below with reference to FIGS. 4 and 5.

After completion of either step S118 or step S120, the ECU 36 can move to step S122. Here, the ECU 36 can return to the AWD control algorithm at step S102 and continue through the algorithm beginning at step S104, as described above, to modulate the rear clutch assemblies 46L, 46R based on the steering angle signal, $\delta_{AWD}$ determined at step S118 or at step S120.

As noted above, the steering angle determination algorithm of FIG. 3 can include a steering angle estimation algorithm at step S120. The steering angle estimation algorithm can permit the ECU 36 to approximate a real-time value of the toe angle of the front wheels 14L, 14R from data provided by sensors other than the steering angle sensor 38. In particular, the steering angle estimation algorithm can permit the ECU 36 to approximate a first steering angle, $\delta_V$, based on the data from the wheel speed sensors 42L, 42R. Also, the steering angle determination algorithm can permit the ECU 36 to approximate a second steering angle, $\delta_Y$, based on data received from the yaw rate sensor 40. The algorithm can include further steps that enable the ECU 36 to select from the first and second steering angles, $\delta_V$ and $\delta_Y$, to determine the best approximation of the real-time toe angle of the front wheels 14L, 14R. Further details of the steering angle estimation algorithm will be described below with reference to FIG. 5.

Figure 4:
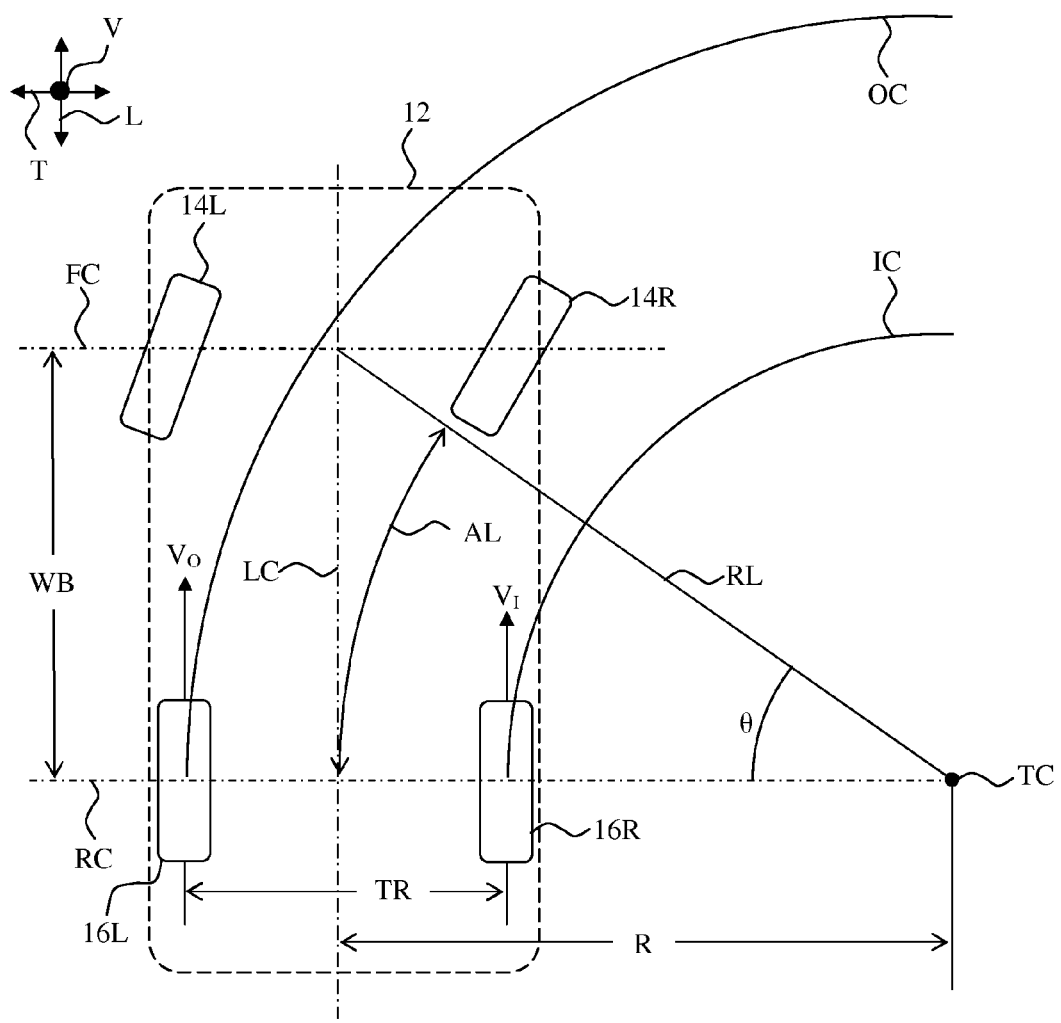
FIG. 4 is a schematic depicting various physical parameters of the vehicle of FIG. 1 traversing a curved path.

FIG. 4 schematically represents the parameters underlying the equations used by the steering angle estimation algorithm to calculate the first and second steering angles, $\delta_V$ and $\delta_Y$. The vehicle 12 can include a longitudinal centerline LC, a front centerline FC and a rear centerline RC. The longitudinal centerline LC extends in the longitudinal direction L down the transverse center of the vehicle 12. The front centerline FC extends in the transverse direction T of the vehicle 12 and through the pivot points (not shown) of the front wheels 14L, 14R. The rear centerline RC extends through the rotational centers of the rear wheels 16L, 16R. The rotational centers of the front wheels 14L, 14R are spaced in the longitudinal direction L from the rotational centers of the rear wheels 16L, 16R by a wheelbase distance, WB. And, the rear wheels 16L, 16R are spaced apart in the transverse direction T by a track width distance, TR measured to the centerlines (relative to the transverse direction T) of the rear wheels 16L, 16R.

FIG. 4 depicts the vehicle 12 traversing a right-hand curve centered about a turning center TC with the front wheels 14L, 14R pivoted to the right. The longitudinal centerline LC is spaced from the turning center TC measured along the rear centerline RC by a radial distance, R. A radial line RL extends from the intersection of the front centerline FC with the longitudinal centerline LC and intersects the rear centerline RC at the turning center TC of the vehicle 12.

An average toe angle, θ, represents an average of the angles at which the two front wheels 14L, 14R are pivoted under this scenario. The average toe angle, θ, of the front wheels 14L, 14R is the angle measured between the radial line RL and rear centerline RC. (The average toe angle, θ, also is the angle between the radial line RL and the front centerline FC.)

An arc of a circle centered about the turning center TC, extending from the radial line RL, and terminating at the intersection of the longitudinal centerline LC with the rear centerline RC has an arc length, AL. It is assumed that the arc length, AL, is substantially equal to the wheelbase distance, WB. From this assumption, the arc length formula provides the following relationship:

$$\theta = \frac{WB}{R} \quad \text{(equation 1)}$$

where the average toe angle, θ, is expressed in radians.

In the scenario depicted by FIG. 4, the left rear wheel 16L travels at an outside wheel speed, $V_O$, and follows an outside circular path OC. The right rear wheel 16R travels at an inside wheel speed, $V_I$, and follows an inside circular path IC, where the inside circular path IC is concentric with the outside circular path OC, has a smaller radius than the outside circular path OC, and the inside circular path IC and the outside circular path OC are centered on the turning center TC. Also, the outside speed, $V_O$, is greater than the inside speed, $V_I$. As a result, the two following equations of motion for the respective rear wheels 16L, 16R can be derived:

$$2\pi \times \left(R + \frac{TR}{2}\right) = V_O \times t \quad \text{(equation 2)}$$

$$2\pi \times \left(R - \frac{TR}{2}\right) = V_I \times t \quad \text{(equation 3)}$$

where t represents the amount of time elapsed while traveling each circular path OC, IC.

These equations of motion (equations 2 and 3) can be combined into a single equation by solving each for the time, t. The resultant equation can be combined with the arc length approximation (equation 1) discussed above after solving each for the radial distance, R. The following equation for the average toe angle, θ, can result:

$$\theta = \frac{V_O - V_I}{V_O + V_I} \times \frac{2 \times WB}{TR} \quad \text{(equation 4)}$$

where the average toe angle, θ, is expressed in radians.

Typical steering systems include a reduction drive (not shown) between the steering wheel and the front wheels 14L, 14R that defines a steering ratio, SR. For example, the steering ratio can be defined by a gear ratio of a rack and pinion assembly (not shown) positioned intermediate the steering column (not shown) and the tie rods (not shown) of the steering system. In such known steering systems, the steering angle sensor 38 can be placed intermediate the steering wheel and the reduction drive. Thus, the first steering angle, $\delta_V$, can be determined according to the following equation:

$$\delta_V = SR \times \theta \times \frac{180}{\pi} \quad \text{(equation 5)}$$

By combining the average toe angle equation (equation 4) and first steering angle equation (equation 5), the first steering angle, $\delta_V$, can be expressed as:

$$\delta_V = \frac{V_O - V_I}{V_O + V_I} \times \frac{360 \times Wb \times SR}{\pi \times TR}$$

In this equation, only the values for the inside and outside wheel speeds, $V_I$ and $V_O$, vary over time. The rear wheel speed sensors 42L, 42R can provide real-time speed data to the ECU 36 that represents values for the outside wheel speed, $V_O$, and the inside wheel speed, $V_I$, respectively. Thus, the first steering angle, $\delta_V$, can represent a real-time, wheel velocity-based estimate of the steering angle signal, $\delta_{AWD}$, using data from the rear wheel speed sensors 42L, 42R. Further, the first steering angle, $\delta_V$, can be independent from the data from the steering angle sensor 38 so that the ECU 36 can rely on the first steering angle, $\delta_V$, when data from the steering angle sensor 38 is unavailable due to incomplete calibration (see, for example, step S116 of FIG. 3) or other inaccuracy or an interruption of data from the steering angle sensor 38.

As mentioned above, the steering angle, $\delta_{AWD}$, can also be approximated using data from the yaw rate sensor 40. The data from the yaw rate sensor 40 can be used by the ECU 36 to calculate the second steering angle, $\delta_Y$. Thus, the second steering angle, $\delta_Y$, also can be independent from the data generated by the steering angle sensor 38, as well as independent of the first steering angle, $\delta_V$.

With continued reference to FIG. 4, the radial distance R defining the circumference of any circular path centered about the turning center TC that the vehicle 12 traverses can be expressed by the following equation:

$$R = \frac{360 \times V_V \times Y}{2\pi} \quad \text{(equation 6)}$$

where:

$V_V$ is the real-time speed of the vehicle 12 expressed in units of distance per second; and Y is the real-time data from the yaw rate sensor 40 expressed in degrees per second.

In an exemplary embodiment according to the disclosed subject matter, the vehicle speed, $V_V$, can be derived from real-time data generated by the transmission output shaft speed sensor 44. However, any source(s) known to be capable of generating real-time data representing the vehicle speed, $V_V$, can be used, such as, but not limited to, use of any combination of the wheel speed sensors 42L, 42R, 43L, 43R as described above, or the engine speed in combination with the gear ratio active in the transmission 20, or data from a longitudinal acceleration sensor, or an optical ground speed sensor, or a Tire Pressure Monitoring System (TPMS)-based speed sensor, or data from a global positioning system (gps). The TPMS sensor typically measures the pressure within the tire, and reports it back to an ECU. It is possible to install an acceleration sensor into the TPMS, which could be used to calculate the tire speed.

Combining this yaw rate-based expression for the radial distance, R, (equation 6) with the arc length formula (equation 1)—after solving the arc length formula (equation 1) for the radial distance, R—can result in the following equation:

$$\theta = \frac{2\pi \times WB \times Y}{360 \times V_V} \quad \text{(equation 7)}$$

where the average toe angle, $\theta$, is expressed in radians.

Like the first steering angle, $\delta_V$, the second steering angle, $\delta_Y$, can be expressed in terms of the average toe angle, $\theta$, and the steering ratio, R, as:

$$\delta_Y = SR \times \theta \times \frac{180}{\pi} \quad \text{(equation 8)}$$

Combining the average toe angle equation (equation 7) and second steering angle equation (equation 8) can result in the following expression for the second steering angle, $\delta_Y$:

$$\delta_Y = \frac{WB \times Y \times SR}{V_V}$$

In this equation, only the values for the yaw rate, Y, and the vehicle speed, $V_V$, vary over time. Real-time data representing the yaw rate, Y, can be generated by the yaw rate sensor 40 and real-time data representing the vehicle speed, $V_v$, can be generated by the transmission output shaft speed sensor 44. Thus, the second steering angle, $\delta_Y$, can represent a real-time, yaw rate-based estimate of the steering angle, $\delta_{AWD}$. Further, the second steering angle, $\delta_Y$, can be independent from the data from the steering angle sensor 38 so that the ECU 36 can rely on the second steering angle, $\delta_Y$, when data from the steering angle sensor 38 is unavailable due to incomplete calibration (see, for example, step S116 of FIG. 3) or other inaccuracy or an interruption of data from the steering angle sensor 38.

Figure 5:
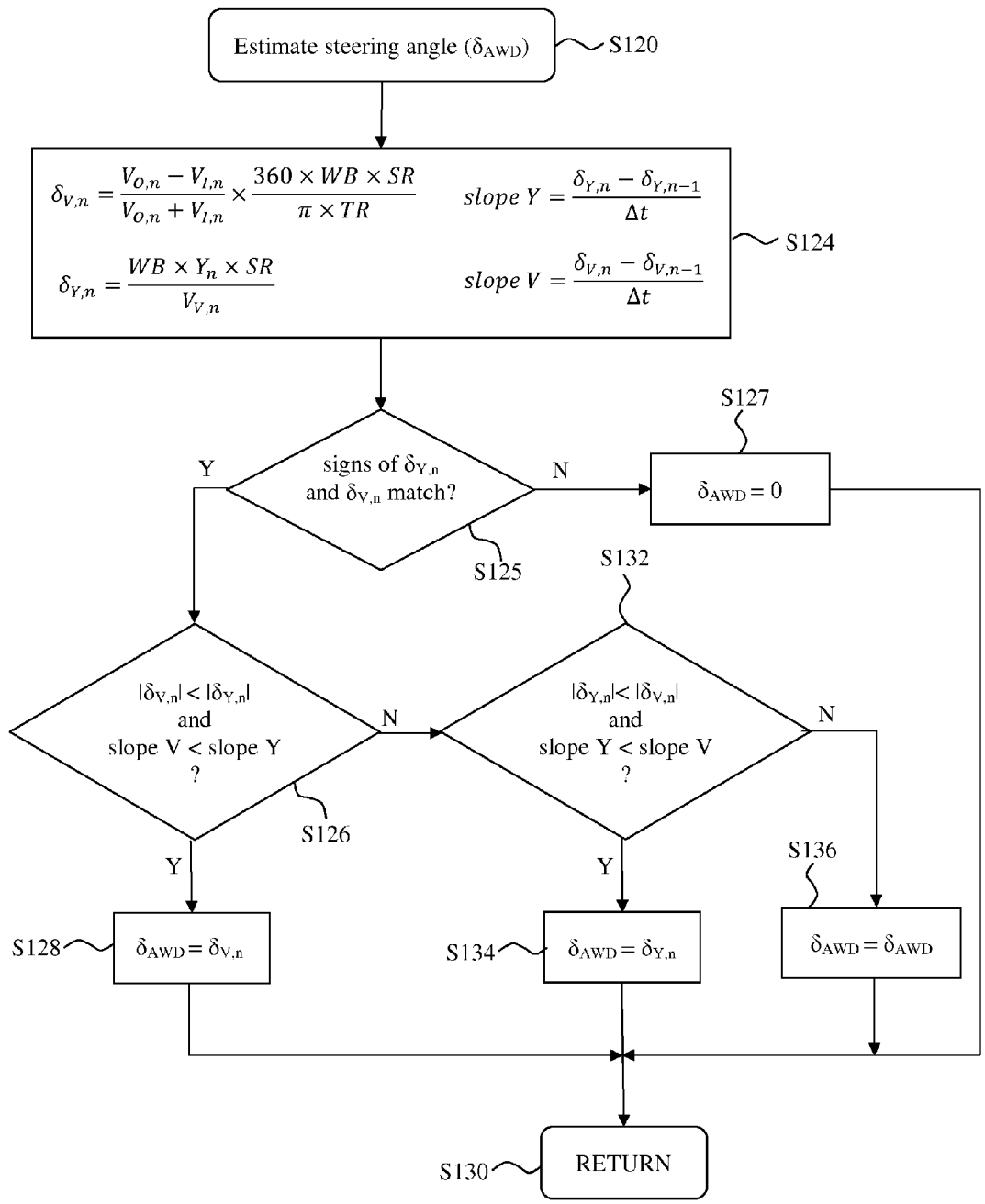
FIG. 5 is a flowchart depicting an exemplary algorithm usable as a subroutine of the algorithm of FIG. 3.

FIG. 5 depicts a flowchart representing the steering angle estimation algorithm of step S120 that utilizes the first and second steering angles, $\delta_V$ and $\delta_Y$. Upon beginning the steering angle estimation algorithm at step S120, the ECU 36 can move to step S124. During step S124, the ECU 36 can determine values for each of the first steering angle, $\delta_V$, and the second steering angle, $\delta_Y$, in accordance with the above equations and using the real-time data received from the yaw rate sensor 40, the wheel speed sensors 42L, 42R, and the transmission output shaft sensor 44. The ECU 36 can be configured to store each value calculated for the first and second steering angles, $\delta_V$ and $\delta_Y$, after every iteration of the steering angle estimation algorithm. Any storage device known in the art can be used for this purpose.

Because the ECU 36 can recall previous values calculated for the first and second steering angles, $\delta_V$ and $\delta_Y$, the steering angle estimation algorithm can permit the ECU 36 to calculate the rate of change of the first and second steering angles, $\delta_V$ and $\delta_Y$, with respect to time. In particular, the first rate of change, slope V, of the first steering angle, $\delta_V$, and the second rate of change, slope Y, of the second steering angle, $\delta_Y$, can be calculated according to the following equations:

$$\text{slope } V = \frac{\delta_{V,n} - \delta_{V,n-1}}{\Delta t}$$

$$\text{slope } Y = \frac{\delta_{Y,n} - \delta_{Y,n-1}}{\Delta t}$$

Then, the ECU 36 can proceed to step S126 to begin the process of selecting the most advantageous estimate for the steering angle signal, $\delta_{AWD}$, from either a predetermined constant value, the first steering angle, $\delta_V$, the second steering angle, $\delta_Y$, or a previously selected one of the first steering angle, $\delta_V$, and the second steering angle, $\delta_Y$. In the exemplary embodiment of FIG. 5, the ECU 36 can be configured to select the predetermined constant value if a comparison of the first steering angle, $\delta_V$, with the second steering angle, $\delta_Y$, suggests a fault error in the system 34 or suggests an erratic driving input from the operator of the vehicle 12. Also in this exemplary embodiment, a minimum function comparison of the values of the current and previous first steering angle, $\delta_{V,n}$ and $\delta_{V,n-1}$, with the values of the current and previous second steering angles, $\delta_{Y,n}$ and $\delta_{Y,n-1}$, can be used.

At step S125, the ECU 36 can compare the signs (i.e., positive or negative) of the first steering angle, $\delta_V$, and the second steering angle, $\delta_Y$. If these steering angles, $\delta_V$, $\delta_Y$, are either both positive or both negative, then generally it can be assumed that the calculations of the steering angles, $\delta_V$, $\delta_Y$, are reliable and the operator is not providing large and/or erratic changes in directional input to the steering system. However, if one of the first steering angle, $\delta_V$, and the second steering angle, $\delta_Y$, is negative and the other is positive, then it can either be assumed that there is a fault or that the driver is quickly changing the steering input between a left turning input and a right turning input. Under this condition of the steering angles, $\delta_V$, $\delta_Y$, the ECU 36 can be configured to select a constant value that can have a minimum impact on the stability of the vehicle 12. Thus, this comparison can account for a fault in the calculation of either the first steering angle, $\delta_V$, or the second steering angle, $\delta_Y$, as well as for any erratic input to the steering system by the operator of the vehicle 12.

In particular, at step S125, the ECU 36 can compare the sign of the first steering angle, $\delta_V$, to the sign of the second steering angle, $\delta_Y$. If the signs do not match (i.e., one is positive and one is negative), then the ECU 36 can proceed to step S127. However, if the ECU 36 determines that both signs are positive or that both signs are negative, then the ECU 36 can proceed to step S126 where the ECU 36 can select the appropriate one of the first steering angle, $\delta_V$, and the second steering angle, $\delta_Y$, to estimate the steering angle signal, $\delta_{AWD}$.

At step S127, the ECU 36 can select the constant predetermined value to estimate the steering angle signal, $\delta_{AWD}$. This predetermined value can have any appropriate value. In this exemplary embodiment, this predetermined value can be zero. A value of zero can correspond to the condition of the vehicle 12 where it is traveling along a straight path. Thus, estimating the steering angle signal, $\delta_{AWD}$, to be zero can minimize any impact on the stability of the vehicle 12 when it is subject to large and/or erratic changes in directional input from the operator or when the calculation of the steering angles, $\delta_V$, $\delta_Y$, might be unreliable. Then, the ECU 36 can proceed to step S130 where the ECU 36 can return to step S102 of the AWD control algorithm (FIG. 2) via step S122 of the steering angle determination algorithm (FIG. 3).

At step S126, the ECU 36 can determine if the current first steering angle, $\delta_{V,n}$, should be selected for use at steps S104 and S106 of the AWD control algorithm (FIG. 2) as the steering angle signal, $\delta_{AWD}$. If the magnitude of the current first steering angle value, $\delta_{V,n}$, and the value of the first rate of change, slope V, calculated at step S124 are less than the magnitude of the current second steering angle value, $\delta_{Y,n}$, and the current value of the second rate, slope Y, respectively, then the ECU can move to step S128.

At step S128, the ECU 36 can assign the steering angle signal, $\delta_{AWD}$, with the current first steering angle, $\delta_{V,n}$. Then the ECU 36 can proceed to step S130 where the ECU 36 can return to step S102 of the AWD control algorithm (FIG. 2) via step S122 of the steering angle determination algorithm (FIG. 3).

If either of these conditions is not met, the ECU 36 can discard the current first steering angle value, $\delta_{V,n}$, for the steering angle signal, $\delta_{AWD}$. As such, the ECU 36 can move to step S132. Here, the ECU 36 can determine if the current second steering angle, $\delta_{Y,n}$, should be selected for use at steps S104 and S106 of the AWD control algorithm (FIG. 2) as the steering angle signal, $\delta_{AWD}$. If the magnitude of the current second steering angle, $\delta_{Y,n}$, and the value of the second rate of change, slope Y, calculated at step S124 are less than the magnitude of the current first steering angle, $\delta_{V,n}$, and the current value of the first rate of change, slope V, respectively, then the ECU can move to step S134.

At step S134, the ECU 36 can assign steering angle signal, $\delta_{AWD}$, with the current second steering angle, $\delta_{Y,n}$. Then the ECU 36 can proceed to step S130 where the ECU 36 can return to step S102 of the AWD control algorithm (FIG. 2) via step S122 of the steering angle determination algorithm (FIG. 3).

If the ECU 36 determines at steps S126 and S132, that the current first and second steering angles, $\delta_{V,n}$, $\delta_{Y,n}$, do not satisfy the above-referenced conditions, then the ECU 36 can proceed to step S136. That is, the ECU can proceed to step S136 if the first steering angle is greater than or equal to the second steering angle when the first rate of change is less than the second rate of change. And, the ECU 36 can proceed to step S136 if the first steering angle is less than the second steering angle when the first rate of change is greater than or equal to the second rate.

At step S136, the ECU 36 can use the previous determined steering angle signal, $\delta_{AWD}$, as the current the steering angle signal, $\delta_{AWD}$, where the previously determined steering angle signal, $\delta_{AWD}$, is determined from the last complete iteration of the steering angle estimation algorithm. Then, the ECU 36 can proceed to step S130 where the ECU 36 returns to step S102 of the AWD control algorithm (FIG. 2) via step S122 of the steering angle determination algorithm (FIG. 3).

However, it is possible to select the current first steering angle, $\delta_{V,n}$, or the current second steering angle, $\delta_{Y,n}$, based on only one comparison condition. For example, the determination of the value for the steering angle can be based on the lesser value of the current first steering angle value, $\delta_{V,n}$, and the current second steering angle value, $\delta_{Y,n}$. In another alternate embodiment other condition(s) can be used in addition to, or in place of any or all of, the conditions specified above.

Thus, the control system 34 can modulate the rear clutch assemblies 46L, 46R in concert with the real-time toe angle of the front wheels 14L, 14R regardless of status (calibrated, interrupted, etc.) of the data from steering angle sensor 38. Thus, this feature also can be beneficial when there is an error with or a failure of the steering angle sensor 38, regardless of whether the steering angle sensor 38 is a relative position sensor or an absolute position sensor.

Additionally, in the exemplary embodiment of FIG. 1, the ECU 36 can be provided with software that can permit the ECU 36 to calibrate the relative position steering angle sensor 38. Thus, the cost and/or complexity advantage(s) of a relative position sensor can be maintained. Further, other operator assistance systems known in the art, such as, but not limited to, an electric power steering system (EPS), a four-wheel steering system (4ws), and a braked-based vehicle stability assistance system (aka, VSA, VSC, or ESP), can rely on steering sensor data. Many of these assistance systems do not require determination of the neutral position. As such, raw data from the relative position steering angle sensor 38 can be sufficient for these operator assistance systems and can be shared by each of these operator assistance systems along with the exemplary all-wheel drive control system 36 of the presently disclosed subject matter, thereby further reducing overall cost and complexity for the vehicle 12.

The ECU 36 referred to herein can be configured with hardware alone, or to run software, that permits the ECU to send, receive, process and store data and to electrically communicate with sensors, manual switches, actuators and/or other ECUs via electrical communication lines (not numbered—shown as dotted lines in FIG. 1). These lines can be in the form of wires or can be in the form of wireless communication signals. Electrical communication can be either one-way communication or two-way communication and can be networked or not networked in any manner known in the art.

The sensors 38, 40, 42L, 42R can be configured with hardware, with or without software, to perform the assigned task(s). Each of the sensors 38, 40, 42L, 42R can be configured as a smart sensor such that the sensor 38, 40, 42L, 42R can process the raw data collected by the sensor 38, 40, 42L, 42R prior to transmission to the ECU 36 or the sensor 38, 40, 42L, 42R can be configured as a simple sensor that passes the raw data directly to the ECU 36 without any manipulation of the raw data. The sensor 38, 40, 42L, 42R can be configured to send data to the ECU 36, with or without a prompt from the ECU 36.

The steering angle sensor 38 can be omitted from the control system 34 and the steering angle signal, $\delta_{AWD}$, can be determined solely based on the selection of the first steering angle, $\delta_V$, or the second steering angle, $\delta_Y$, as described above. In this alternate embodiment, the algorithm can be modified to omit any or all steps associated with processing data from the steering angle sensor 38. Exemplary steps that can be omitted can be, but are not limited to step S112, step S114, step S116 and/or step S118, as illustrated in FIG. 3.

The power source 18 can be an internal combustion engine, an electric motor or a hybrid of the two, all of which are known in the art. The transmission 20 can be an automatic transmission, a manual transmission, or a semi-automatic transmission, and can include a plurality of stepped gear ratios or can have continuously variable gear ratios, all of which are known in the art. The front differential assembly 22 can have any known configuration, including, but not limited to, an open-type differential or a limited-slip-type differential. The clutch assemblies 46L, 46R can be configured in any manner known in the art, such as, but not limited to, electromagnetic actuated clutch plates or hydraulically actuated clutch plates. The rear differential assembly 30 can include a planetary gear assembly. However, this planetary gear assembly can be omitted depending on the desired application for the vehicle. Exemplary rear differential assemblies and their operation are disclosed in U.S. Patent Application Publication No. 2007/0260388 and co-pending U.S. patent application Ser. No. 12/847,880, entitled, "Control System and Method for Automatic Control of Selection of On-Demand All-Wheel Drive Assembly for A Vehicle Drivetrain", referenced above.

While certain embodiments of the invention are described above, it should be understood that the invention can be embodied and configured in many different ways without departing from the spirit and scope of the invention. For example, the estimated steering angle algorithm can be used with any one of, or any combination of the operator assistance systems described above. Further, the estimated steering angle algorithm can be used with active vehicle control systems, such as, but not limited to, intelligent transportation systems (ITS), where the ECU can control the vehicle 12 without input from the operator, or alternatively, where the ECU can override the operator's input.

In an alternate embodiment, the steering angle sensor 38 can be an absolute position sensor such that the controller 36 does not need to determine the neutral position. In this alternate embodiment, if the performance of the absolute position steering angle sensor is less than optimal or ceases, then the controller 36 can use the estimated steering angle algorithm to maintain on a temporary basis the torque vectoring feature of the control system 36.

Additionally, other mathematical analysis function(s) can be used to select either the first steering angle, $\delta_V$, the second steering angle, $\delta_Y$, or a previously selected one of the first steering angle, $\delta_V$, and the second steering angle, $\delta_Y$. In another alternate embodiment, any fixed value can be assigned to the steering angle signal, $\delta_{AWD}$, when neither the first steering angle, $\delta_V$, nor the second steering angle, $\delta_Y$, is desirable.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for determining an angular position of a pair of steerable wheels of a vehicle having a plurality of wheels comprising:
   a steering angle sensor configured to output sensor angle data representative of a toe angle of the steerable pair of wheels, the steering angle sensor being a relative position sensor;
   a yaw rate sensor configured to output data representative of an angular velocity of the vehicle about a vertical axis of the vehicle;
   a pair of wheel speed sensors, wherein each wheel speed sensor is configured to output data representative of a rotational velocity of a respective one of the plurality of wheels; and
   a controller in electrical communication with each of the pair of wheel speed sensors and the yaw rate sensor, one of the relative position sensor and the controller being configured to determine a neutral position of the relative position sensor such that the neutral position corresponds to a position of the relative position sensor when the vehicle travels along a substantially straight path, and the controller being configured to:
      determine a first steering angle based on data received from the plurality of wheel speed sensors;
      determine a second steering angle based on data received from the yaw rate sensor; and
      determine the angular position of the pair of steerable wheels to be one of the first steering angle and the second steering angle until one of the relative position sensor and the controller determines the neutral position.

2. The system for determining an angular position of a pair of steerable wheels of a vehicle according to claim 1, wherein the controller is configured to determine the angular position of the pair of steerable wheels to be one of the first steering angle and the second steering angle based on:
   a comparison of the first steering angle relative to the second steering angle; and
   a comparison of a rate of change over time of the first steering angle relative to a rate of change over time of the second steering angle.

3. The system for determining an angular position of a pair of steerable wheels of a vehicle according to claim 1, wherein the controller is configured to determine the angular position of the pair of steerable wheels to be one of the first steering angle and the second steering angle by:
   determining a first rate of change of the first steering angle with respect to time;
   determining a second rate of change of the second steering angle with respect to time;
   selecting the first steering angle when the first steering angle is less than the second steering angle and the first rate of change is less than the second rate of change;
   selecting the second steering angle when the second steering angle is less than the first steering angle and the second rate of change is less than the first rate of change;
   selecting a previously selected one of the first steering angle and the second steering angle when the first steering angle is less than the second steering angle and the first rate of change is greater than or equal to the second rate; and
   selecting a previously selected one of the first steering angle and the second steering angle when the first steering angle is greater than or equal to the second steering angle and the first rate of change is less than the second rate of change.

4. The system for determining an angular position of a pair of steerable wheels of a vehicle according to claim 1, wherein the controller is configured to
determine whether the first steering angle is positive or negative,
determine whether the second steering angle is positive or negative, and
estimate the angular position of the pair of steerable wheels to be zero if the first steering angle is positive and the second steering angle is negative or if the first steering angle is negative and the second steering angle is positive.

5. The system for determining an angular position of a pair of steerable wheels of a vehicle according to claim 1, wherein the controller is configured to select the sensor angle data after the one of the relative position sensor and the controller determines the neutral position.

6. A method for determining a steering angle of a pair of steerable wheels of a vehicle having a plurality of wheels comprising:
providing a relative position steering angle sensor;
determining a neutral position of the steering angle sensor, where the neutral position corresponds to a position of the steering angle sensor when the vehicle travels a substantially straight path;
determining a first steering angle based on rotational velocity data of the plurality of wheels;
determining a second steering angle based on a yaw rate of the vehicle; and
determining the steering angle of the pair of steerable wheels to be one of the first steering angle and the second steering angle during the determining a neutral position.

7. The method for determining a steering angle of a pair of steerable wheels of a vehicle according to claim 6, wherein the determining the steering angle of the pair of steerable wheels to be one of the first steering angle and the second steering angle includes,
comparing the first steering angle relative to the second steering angle; and
comparing a rate of change with respect to time of the first steering angle relative to a rate of change with respect to time of the second steering angle.

8. The method for determining a steering angle of a pair of steerable wheels of a vehicle according to claim 6, wherein the determining the steering angle of the pair of steerable wheels to be one of the first steering angle and the second steering angle includes,
determining a first rate of change of the first steering angle over time;
determining a second rate of change of the second steering angle over time;
selecting the first steering angle when the first steering angle is less than the second steering angle and the first rate of change is less than the second rate of change;
selecting the second steering angle when the second steering angle is less than the first steering angle and the second rate of change is less than the first rate of change;
selecting a previously selected one of the first steering angle and the second steering angle when the first steering angle is less than the second steering angle and the first rate of change is greater than or equal to the second rate of change; and
selecting a previously selected one of the first steering angle and the second steering angle when the first steering angle is greater than or equal to the second steering angle and the first rate of change is less than the second rate of change.

9. The method for determining a steering angle of a pair of steerable wheels of a vehicle according to claim 6, further comprising:
determining whether the first steering angle is positive or negative;
determining whether the second steering angle is positive or negative; and
estimating the angular position of the pair of steerable wheels to be zero if the first steering angle is positive and the second steering angle is negative or if the first steering angle is negative and the second steering angle is positive.

10. The method for determining a steering angle of a pair of steerable wheels of a vehicle according to claim 6, further comprising:
selecting data from the relative position steering angle sensor after the determining a neutral position.

11. A control system for an all-wheel drive powertrain of a vehicle having a power source configured to produce torque, a steerable pair of wheels configured to be driven by the torque, and a second pair of wheels configured to be selectively driven by the torque, the control system comprising:
a first clutch assembly selectively connecting a first wheel of the second pair of wheels to the power source; and
a second clutch assembly selectively connecting a second wheel of the second pair of wheels to the power source;
a relative position steering angle sensor configured to output sensor angle data representative of a toe angle of the steerable pair of wheels,
a yaw rate sensor configured to output data representative of an angular velocity of the vehicle about a vertical axis of the vehicle;
a pair of wheel speed sensors, wherein each wheel speed sensor is configured to output data representative of a rotational velocity of a respective one of the second pair of wheels; and
a controller in electrical communication with each of the plurality of wheel speed sensors and the yaw rate sensor, one of the relative position steering angle sensor and the controller being configured to determine a neutral position of the relative position steering angle sensor such that the neutral position corresponds to a position of the relative position steering angle sensor when the vehicle travels a substantially straight path, and the controller being configured to,
determine a first steering angle based on data received from the plurality of wheel speed sensors;
determine a second steering angle based on data received from the yaw rate sensor;
determine an angular position of the steerable pair of wheels to be one of the first steering angle and the second steering angle until the one of the relative position steering angle sensor and the controller has determined the neutral position; and
modulate the clutch assemblies based on the angular position of the steerable pair of wheels to vary transmission of torque from the power source to the second pair of wheels.

12. The control system for an all-wheel drive powertrain of a vehicle according to claim 11, wherein the controller is configured to select the sensor angle data after the one of the relative position steering angle sensor and the controller has determined the neutral position.

13. The control system for an all-wheel drive powertrain of a vehicle according to claim 11, wherein the controller is configured to determine the angular position of the steerable pair of wheels to be one of the first steering angle and the second steering angle by, determining a first rate of change of the first steering angle with respect to time, determining a second rate of change of the second steering angle with respect to time, selecting the first steering angle when the first steering angle is less than the second steering angle and the first rate of change is less than the second rate of change, selecting the second steering angle when the second steering angle is less than the first steering angle and the second rate of change is less than the first rate of change, selecting a previously selected one of the first steering angle and the second steering angle when the first steering angle is less than the second steering angle and the first rate of change is greater than or equal to the second rate of change, and selecting a previously selected one of the first steering angle and the second steering angle when the first steering angle is greater than or equal to the second steering angle and the first rate of change is less than the second rate of change.

14. The control system for an all-wheel drive powertrain of a vehicle according to claim 11, wherein the controller is configured to, modulate the clutch assemblies equally such that each clutch assembly transfers an equal amount of torque to a respective one of the second pair of wheels, and modulate each clutch assembly independently such that torque transferred by the first clutch assembly to the first wheel is greater than torque transferred by the second clutch assembly to the second wheel based on one of the angular position determined by the controller and the sensor angle data.

15. The control system for an all-wheel drive powertrain of a vehicle according to claim 11, further comprising:

a vehicle speed sensor configured to output data representative of a travel velocity of the vehicle, wherein the controller is configured to determine the first steering angle based on data received from the yaw rate sensor and the vehicle speed sensor.

16. The system for determining an angular position of a pair of steerable wheels of a vehicle according to claim 11, wherein the controller is configured to determine whether the first steering angle is positive or negative, determine whether the second steering angle is positive or negative, and estimate the angular position of the pair of steerable wheels to be zero if the first steering angle is positive and the second steering angle is negative or if the first steering angle is negative and the second steering angle is positive.

17. A method for controlling an on-demand all-wheel drive system of a vehicle to supplement an operator's input to the vehicle comprising:

providing a power source, a pair of steerable wheels driven by the power source, a pair of rear wheels selectively driven by the power source, a pair of rear clutch assemblies selectively connecting a respective one of the pair of rear wheels to the power source, a yaw rate sensor configured to output data representative of an angular velocity of the vehicle about a vertical axis of the vehicle, and a pair of wheel speed sensors configured to output data representative of a rotational speed of a respective one of the pair of rear wheels;

providing a relative position steering angle sensor configured to output data representative of angular position of the pair of steerable wheels;

calibrating the relative position steering angle sensor;

determining a first steering angle based on the rotational speed data;

determining a second steering angle based on the data from the yaw rate sensor; and determining the angular position of the pair of steerable wheels to be one of the first steering angle and the second steering angle during the calibrating.

18. The method for controlling an on-demand all-wheel drive system of a vehicle to supplement an operator's input to the vehicle according to claim 17, wherein the determining the angular position of the pair of steerable wheels includes, determining a first rate of change of the first steering angle over time, determining a second rate of change of the second steering angle over time, selecting the first steering angle when the first steering angle is less than the second steering angle and the first rate of change is less than the second rate of change, selecting the second steering angle when the second steering angle is less than the first steering angle and the second rate of change is less than the first rate of change, selecting a previously selected one of the first steering angle and the second steering angle when the first steering angle is less than the second steering angle and the first rate of change is greater than or equal to the second rate of change, and selecting a previously selected one of the first steering angle and the second steering angle when the second steering angle is less than the first steering angle and the second rate of change is greater than or equal to the first rate of change.

19. The method for controlling an on-demand all-wheel drive system of a vehicle to supplement an operator's input to the vehicle according to claim 17, further comprising:

selecting the angular position data after the calibrating.

20. The method for controlling an on-demand all-wheel drive system of a vehicle to supplement an operator's input to the vehicle according to claim 19, further comprising:

modulating the rear clutch assemblies based on one of the determined angular position and the angular position data.

21. The method for controlling an on-demand all-wheel drive system of a vehicle to supplement an operator's input to the vehicle according to claim 17, further comprising:

determining whether the first steering angle is positive or negative;

determining whether the second steering angle is positive or negative; and estimating the angular position of the pair of steerable wheels to be zero if the first steering angle is positive and the second steering angle is negative or if the first steering angle is negative and the second steering angle is positive.

* * * * *